F. E. HABERSHAM.
Cotton-Seed Planters.
No. 133,983.  Patented Dec. 17, 1872.
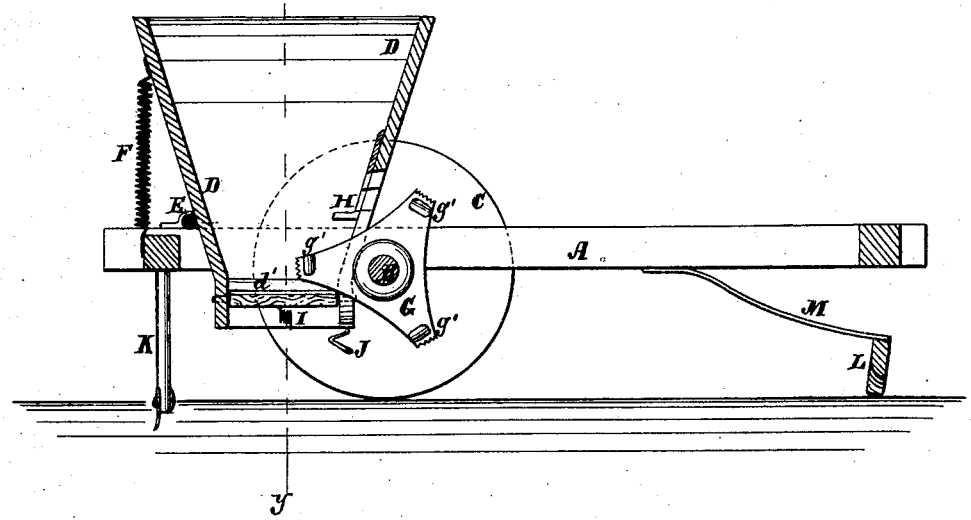
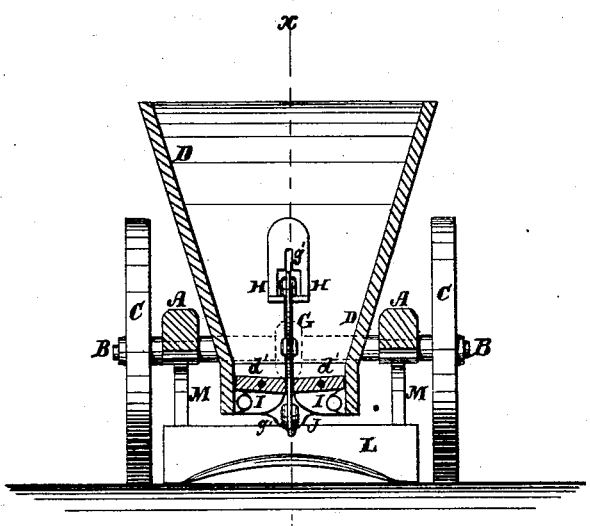
Witnesses:
A Benneckendorf
C. Sedgwick
Inventor:
F. E. Habersham
per Munn & Co.
Attorneys.

UNITED STATES PATENT OFFICE.

FRANCIS E. HABERSHAM, OF OLD CHURCH, VIRGINIA.

IMPROVEMENT IN COTTON-SEED PLANTERS.

Specification forming part of Letters Patent No. 133,983, dated December 17, 1872.

*To all whom it may concern:*

Be it known that I, FRANCIS E. HABERSHAM, of Old Church, in the county of Hanover and State of Virginia, have invented a new and useful Improvement in Cotton-Seed Planter, of which the following is a specification:

In the accompanying drawing, Figure 1 is a detail vertical section of my improved planter taken through the line $x\,x$, Fig. 2; and Fig. 2 is a detail vertical cross-section of the same taken through the line $y\,y$, Fig. 1.

Similar letters of reference indicate corresponding parts.

My invention has for its object to furnish an improved machine for planting cotton-seed, which shall be simple in construction, convenient in use, and effective and reliable in operation; and it consists in the arrangement of an armed plate, slotted and hinged hopper, and supplemental devices, as hereinafter described.

A is the frame of the machine, consisting of two long side bars connected near their ends by two short cross-bars. B is the axle, which revolves in bearings attached to the side bars of the frame A toward their forward ends, and to the ends of which are attached the wheels C, so as to carry the said axle with them in their revolution. D is the seed-hopper, which is placed just in front of the axle B, and which is hinged at its forward side to the frame A by a rod, E, or other suitable means. The hopper D is held in position by a coiled, elliptic, or other spring, F, connected with its forward side and with the forward part of the frame A, and the elasticity of which allows the hopper to be shaken to shake down the seed. To the center of the axle B is secured a plate, G, by a collar and nut or other convenient means. The plate is made with three or more arms, as shown in Fig. 1. Upon the outer ends of the arms of the plate G are formed saw-teeth, and upon the opposite sides of said arms near their outer ends are secured steel blocks $g'$, as shown in Figs. 1 and 2.

As the machine is drawn forward the armed plate G is revolved, and its arms pass into the hopper D through a slot in its bottom. As the arms of the plate G enter the hopper D the blocks $g'$ strike an inclined plate or block H attached to the inner surface of the rear side of said hopper and depress said rear side. As the blocks $g'$ slip from the inclines H the elasticity of the spring F raises the hopper with a jerk, shaking down the seed.

The bottom $d'$ of the hopper D is made in two sections, parts or halves, which are pivoted at their ends to the front and rear sides of the hopper, and which are held in a horizontal position or nearly so by springs I.

As the arms of the plate G move down through the hopper the blocks $g'$ strike the upper side of the sectional bottom $d'$ at their inner edges, and press down said inner edges, enlarging the slot between them, and allowing the saw-teeth of said arms to draw out a quantity of the seed. As the blocks $g'$ slip from the edges of the sections $d'$ of the bottom of the hopper the springs I raise said sections to their former position.

To the lower part of the rear side of the hopper D is attached a rod or plate, J, bent into such a form or slotted in such a way as to clean off the saw-teeth as the arms of the plate G pass through it.

To the center of the front cross-piece of the frame A is adjustably attached an opening-plow, K, for opening a deeper or shallower furrow to receive the seed. The seed is covered by the block L, the ends of which are attached to the rear ends of the spring-bars M, the forward ends of which are attached to the side bars of the frame A. The lower side of the covering-block L is hollowed out to give a proper form to the top of the ridge.

I am aware that hinged hoppers have been gradually raised and let down by a rigid rod and cams, but it did not give the shaking motion required. Hence I have applied the spring F, so that the hopper will be raised against it, and then thrown down by it so as to rebound, and thus produce the shaking.

Having thus described my invention, I claim as new and desire to secure by Letters Patent—

1. The means described for shaking a hinged and spring-held seed-hopper, consisting of the revolving plate G having blocks $g'$ on its arms, and the inclined hopper-plate H arranged on hopper, as set forth.

2. The means described for distributing the seed from hopper D into the furrow, consisting of a rotary plate, G, having arms with end serrations and blocks $g'$, and the hinged spring-held bottoms $d'$, arranged as set forth.

FRANCIS ELLIOTT HABERSHAM.

Witnesses:
B. E. HABERSHAM,
E. R. BRAXTON.